(12) United States Patent
Maisonhaute et al.

(10) Patent No.: US 8,449,109 B2
(45) Date of Patent: May 28, 2013

(54) TYPE OF LENS FOR EYEGLASSES AND METHOD FOR OBTAINING SAME

(75) Inventors: Laurent Maisonhaute, Coiserette (FR); Nathalie Boyer, Mijoux (FR)

(73) Assignee: Christian Dalloz Sunoptics, Saint Claude (FR)

( * ) Notice: Subject to any disclaimer, the term of this patent is extended or adjusted under 35 U.S.C. 154(b) by 234 days.

(21) Appl. No.: 12/990,606

(22) PCT Filed: Apr. 29, 2009

(86) PCT No.: PCT/FR2009/000506
§ 371 (c)(1),
(2), (4) Date: Nov. 1, 2010

(87) PCT Pub. No.: WO2009/138592
PCT Pub. Date: Nov. 19, 2009

(65) Prior Publication Data
US 2011/0043748 A1  Feb. 24, 2011

(30) Foreign Application Priority Data
May 7, 2008  (FR) ...................................... 08 02535

(51) Int. Cl.
*G02C 7/10* (2006.01)
*G02C 7/02* (2006.01)
(52) U.S. Cl.
CPC ........................................ *G02C 7/10* (2013.01)
USPC ...................... 351/44; 351/159.57; 351/159.6; 351/159.66

(58) Field of Classification Search
CPC ...................................... G02C 7/10; G02C 7/02
USPC ........ 351/41, 44, 49, 159.49, 159.57, 159.59, 351/159.6, 159.65, 159.66, 159.75
See application file for complete search history.

(56) References Cited

U.S. PATENT DOCUMENTS

| 3,516,720 A | | 6/1970 | Mauer |
| 4,045,125 A | | 8/1977 | Farges |
| 5,135,298 A | * | 8/1992 | Feltman ................... 351/159.61 |

FOREIGN PATENT DOCUMENTS

| EP | 1 424 315 A1 | 6/2004 |
| FR | 2 003 177 | 11/1969 |

OTHER PUBLICATIONS

International Search Report issued in Application No. PCT/FR2009/000506; Dated Nov. 3, 2009 (With Translation).

* cited by examiner

*Primary Examiner* — Huy K Mai
(74) *Attorney, Agent, or Firm* — Oliff & Berridge, PLC

(57) ABSTRACT

A new type of lens for eyeglasses and a method for obtaining the same. The lens is composed of a transparent substrate; a composite layer disposed between the substrate and a layer of precious metal, such as gold, the composite layer is composed of at least two layers. A combination for the composite layer is an anti-reflective layer applied directly to the substrate and made of a metal such as chromium; the anti-reflective layer is advantageously made of silicon oxide.

15 Claims, 1 Drawing Sheet

TYPE OF LENS FOR EYEGLASSES AND METHOD FOR OBTAINING SAME

BACKGROUND

The disclosure relates to a new type of lens for eyeglasses and a method for obtaining the same.

The technical field is that of lenses for eyeglasses, whether they are sunglasses or corrective eyeglasses. The term "eyeglasses" includes any device designed to protect the wearer's eyes and/or improve his or her vision.

In embodiments, the lenses have a metallic appearance to the observer looking at these lenses. For example, this metallic appearance may be that of a precious metal, such as gold. "Metallic appearance" in the present specification is understood to include lenses that give the observer the appearance of a precious metal present in the form of a layer in said lenses.

The first goal of embodiments is not protection of the user, and the eyeglasses as defined above are not, basically, designed to protect the user from radiation, such as infrared rays, even though, secondarily, the eyeglasses according to embodiments do offer some degree of protection.

Among the known devices designed to protect the user, one may cite a firefighter mask whose visor is coated with a layer of gold, resistant to high temperatures and thus protecting the firefighter from the strong radiation present at fires. Similar masks, namely those whose visor is coated with a gold layer to protect the user from harmful radiation, are also used by astronauts or spacionauts when they take space walks, or by fighter pilots.

In addition, in the case of the aforementioned masks, the relatively large thickness of the gold layer confers on the lens on which this layer is deposited a high degree of reflection on the side of the lens facing the user; this degree of reflection is not troublesome to the aforementioned professionals because the mask is enveloping, thus considerably limiting the light that may be reflected on the inside of the mask, namely the side facing the wearer of this mask.

The problem of troublesome reflection for the user in the case of eyeglasses has been partly solved by French Patent 2,003,177. In this patent, a layer of metal, such as gold, is sandwiched between two transparent layers, and a metal film is disposed in order to reduce the degree of reflection toward the user. The goal of the lens described in this patent is indeed to filter out radiation with infrared and ultraviolet wavelengths that are harmful to the human eye. However, the rendition of the metallic appearance of the lens according to this disclosure, where the gold layer is sandwiched between two transparent layers, is unsatisfactory, as the metallic appearance of the gold layer may be altered.

SUMMARY

The lenses according to embodiments very substantially improve the metallic appearance, while reducing the thickness of the layer of precious metal such as gold, thus improving light transmission, and reducing the level of reflection toward the user.

The design of the lenses according to embodiments allows optimal utilization of said lenses, meeting the primary objective, which is to confer a metallic appearance on the lens for an observer, and has a number of advantages as will appear in the description herein below.

In embodiments, the design of the lenses has several layers, one of said layers is a transparent substrate, another layer, facing the observer of said lens, is made of precious metal, with an anti-reflection layer is disposed between said substrate and said precious metal layer, said anti-reflection layer is in the form of a composite layer having at least two layers, each of which is anti-reflection, comprised of:

a layer in contact with said transparent substrate, the element of which said layer is chosen from the following materials: chromium, nickel, iron, titanium, aluminum, zinc, lead, tin, tantalum, tungsten, and alloys thereof, and a layer facing the observer of said lens, the element of which said layer is made being chosen from the following materials: silicon, titanium, tantalum, or zirconium oxides.

Various precious metals can be used depending on the appearance to be conferred on the lenses according to embodiments; of these metals, in addition to gold, one may cite metals such as silver, platinum, palladium, titanium, rhodium, zirconium, or ruthenium as well as alloys obtained from these metals.

According to embodiments, said substrate is sandwiched between two layers of anti-scratch varnish, said anti-scratch varnish preferably being based on thermosetting polysiloxane.

According to embodiments, the assembly composed of said substrate and the various layers is sandwiched between two layers of anti-scratch varnish, said anti-scratch varnish being preferably based on thermosetting polysiloxane to which at least one alkoxysiloxane containing a thiol group has been added.

The thickness of the various layers is determinant for obtaining an optimum result for the lenses according to embodiments and the eyeglasses made from said lenses.

BRIEF DESCRIPTION OF THE DRAWINGS

The present invention will be better understood from reading the description herein below with reference to the figures, namely.

DETAILED DESCRIPTION OF EMBODIMENTS

Figure 1:
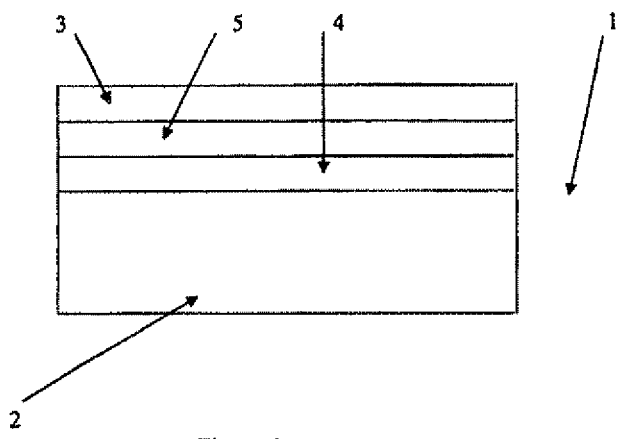
FIG. 1 is a cross-sectional view through a lens according to an embodiment of the invention.

FIG. 1 illustrates, in cross section, a lens according to embodiments. In this figure, the lens as a whole is referenced (1). This lens (1) is composed of a transparent substrate (2); this substrate can be made of an inorganic or organic material such as a polycarbonate or any other material used in eyeglass lenses such as a polyamide, or a thermoplastic or thermosetting resin.

A composite layer may be disposed between the substrate (2) and the layer of precious metal, such as gold (3); according to the embodiment illustrated in this FIG. 1, the composite layer is composed of two layers (4) and (5), each of the two layers being anti-reflecting. This composite layer, because of its composition as will be specified below, both reinforces the metallic appearance despite the reduction in the thickness of the precious metal layer (3), and reduces the mirror effect that is troublesome for the lens wearer. A combination for this composite layer may include a layer (4) applied directly to the substrate (2) and made of a metal such as chromium. This metal layer (4) reinforces the desired metallic appearance, but does not sufficiently decrease the aforesaid mirror effect. Hence, the need to add a layer of silicon oxide (5), by itself reduces the mirror effect. Surprisingly, it has been found that it is this combination of metal layer (4) and silicon oxide layer (5) that both reduces the aforesaid mirror effect, by decreasing the degree of reflection to the user, and reinforces the metallic appearance, for example the gold appearance, which in its turn enables less precious metal to be used and hence reduces the thickness of the layer of this precious metal.

Other combinations are possible for layers (4) and (5). Thus, layer (4) can be made of chromium, as indicated above, but may also be chosen from among the following metals: nickel, iron, titanium, aluminum, zinc, lead, tin, tantalum, tungsten, and their alloys. Likewise, the silicon oxide of layer (5) can be replaced by a titanium, tantalum, or zirconium oxide.

Advantageously, for a substrate (2) thickness of 2 mm, the thickness of layer (4), made of chromium for example, will be 1 to 15 nm, with a preferred value of approximately 4 nm, and the thickness of layer (5), for example made of silicon oxide, can preferably be approximately 20 to 70 nm, with an optimum value of approximately 50 nm. These various thickness values and this choice of substances result in a precious metal layer whose thickness is between 1 and 100 nm, preferably between 10 and 50 nm, depending on the precious metal used, the optimum thickness being approximately 30 nm when the precious metal is gold.

Thus, a lens with a metallic appearance such as gold is obtained, with a very limited mirror effect, while preserving a satisfactory light transmission factor.

Figure 2:
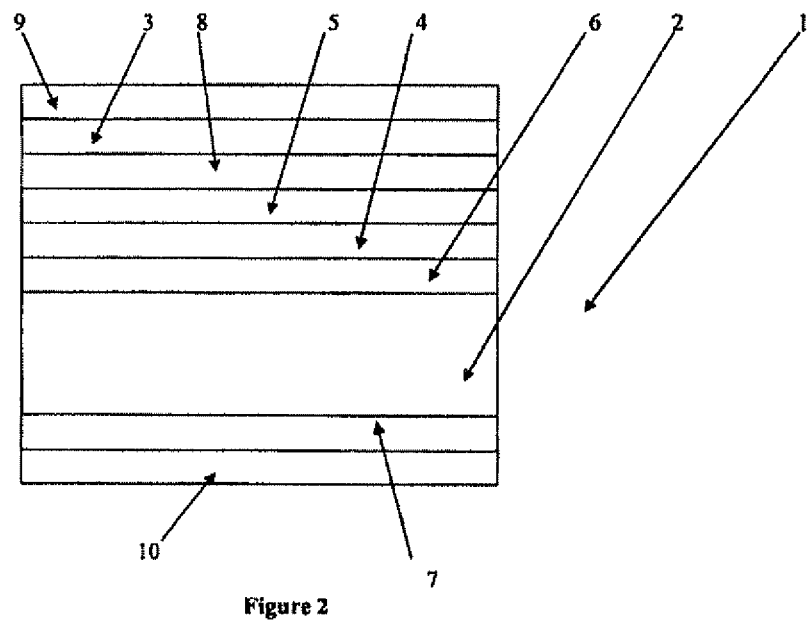
FIG. 2 is a cross-sectional view of an embodiment.

FIG. 2 illustrates an embodiment in which other layers are integrated into said lens.

In this FIG. 2, the lens is referenced as a whole by (1) and has a transparent substrate (2), a precious metal layer (3) whose metallic appearance is desired, a composite layer composed of a layer (4) of a metal such as chromium located on the side of said substrate (2), and a layer (5) of silicon oxide located on the side of the observer of the lens.

According to this embodiment, the substrate (2) is sandwiched between two layers (6), (7) of an anti-scratch varnish. This anti-scratch varnish is advantageously based on thermosetting polysiloxane and protects said substrate (2). This thermosetting polysiloxane composition is obtained for example by hydrolysis and prepolymerization of organo functional alkoxysilanes. It is more particularly used to coat items made of organic material and protect them from abrasion.

Advantageously, an additional layer (8) is inserted between the precious metal layer (3) and the silicon oxide layer (5), such a layer (8) giving better adherence of the precious metal layer (3). This layer (8) is a metallic film made of a metal, preferably chromium, but can also be made of another metal such as nickel, iron, titanium, aluminum, zinc, lead, tin, tantalum, tungsten, or an alloy of these metals.

It has furthermore been shown that the layer of anti-scratch varnish (6), in addition to protecting the substrate (2), also gives better adherence of the chromium layer (4).

In embodiments, the assembly described above, namely the substrate (2) and the various layers (3), (4), (5), (6), (7), and (8) is sandwiched between two layers (9) and (10) made of an anti-scratch varnish based on thermosetting polysiloxane to which has been added at least one alkoxysiloxane having a thio group, which allows better adherence to the gold when the latter is the precious metal of layer (3). These two layers (9) and (10) have the function of protecting the aforesaid assembly. However, it is possible to dispense with these layers (9) and (10) when the precious metal used is strong, which is not the case with gold, which is readily scratchable.

In embodiments, rendition of the metallic aspect of the lens was obtained with the following layer thicknesses:
transparent substrate (2): about 2 mm;
precious metal layer (3): 1 to 100 nm, such as 10 to 50 nm; if the precious metal is gold, approximately 30 nm is chosen;
layer (4): 1 to 15 nm, preferably approximately 4 nm;
layer (5): 2 to 70 nm, preferably approximately 50 nm;
anti-scratch varnish layers (6) (7): 1 to 10 μm:
layer (8): 1 to 5 nm;
anti-scratch varnish layers (9) (10): 1 to 10 μm.

These various values constitute a good compromise between the amount of precious metal used, the rendition of the metallic appearance for the observer of said lens, and limitation of the anti-reflection effect, thus ensuring comfort for the wearer of the lens according to embodiments. Correct light transmission through said lens is also ensured when these values are used.

The embodiments illustrated in FIGS. 1 and 2 referred to above may have a composite layer with two layers, in this case layers (4) and (5), each of which is an anti-reflection layer, this being the minimum number of layers in the composite layer that produce the anti-reflection function; it is understood that, according to the desired features, and without thereby departing from the framework of the present disclosure, this composite layer may be made of more than two layers.

The disclosure also relates to eyeglasses made from the lens according to embodiments, whether they are corrective eyeglasses or sunglasses, it is understood that the composition of the transparent substrate will vary according to the chosen application.

A method for obtaining the lens according to embodiments will now be described.

The substrate (2) is made according to a traditional method, namely, when said substrate is an organic material, this molten material, possibly with pigments added, is injected into a mold.

The anti-scratch varnish layers (6), (7), (9), and (10) are advantageously applied by dipping either the substrate (2) or the assembly composed of substrate (2) plus layers (3), (4), (5), (6), (7), and (8) into a varnish bath, said dipping being followed by drying and oven-curing.

The other layers, namely layers (3), (4), (5), and (8) maybe deposited one at a time by vacuum evaporation.

The invention claimed is:

1. An eyeglass lens having a plurality of layers comprising:
a transparent substrate layer;
a precious metal layer, facing an observer of the lens;
a composite anti-reflection layer disposed between the substrate and the precious metal layer, wherein the composite anti-reflection layer comprises:
a first anti-reflective layer in contact with the transparent substrate, the first anti-reflective layer being made from a material selected from the group consisting of chromium, nickel, iron, titanium, aluminum, zinc, lead, tin, tantalum, tungsten, and alloys thereof, and
a second anti-reflective layer facing the observer of the lens, the second anti-reflective layer being made from a material selected from the group consisting of silicon oxides, titanium oxides, tantalum oxides, and zirconium oxides;
a first anti-scratch varnish layer is interposed between the anti-reflection layer and the substrate; and
a second anti-scratch varnish layer is positioned on a side of the substrate opposite to the first varnish layer,
wherein:
the substrate is sandwiched between the first and second anti-scratch varnish layers, and
both anti-scratch varnish layers comprise thermosetting polysiloxane.

2. The lens according to claim 1, wherein the first anti-reflective layer has a thickness of 1 to 15 nm, and the second anti-reflective layer has a thickness of 20 to 70 nm.

3. The lens according to claim 2, wherein the first anti-reflective layer has a thickness of 4 nm, and the second anti-reflective layer has a thickness of 50 nm.

4. The lens according to claim 1, wherein each of the anti-scratch varnish layers is from 1 to 10 μm thick.

5. The lens according to claim 1, wherein a metal film is disposed between the precious metal layer and the second anti-reflective layer.

6. The lens according to claim 5, wherein the metal film is selected from the group consisting of chromium, nickel, iron, titanium, aluminum, zinc, lead, tin, tantalum, tungsten, and alloys thereof.

7. The lens according to claim 6, wherein the metal film has a thickness of from 1 to 5 nm.

8. The lens according to claim 5, wherein an assembly comprised of the substrate, the precious metal layer, the first and second anti-reflective layers, the first and second varnish layers, and the metal film is sandwiched between a third and a fourth anti-scratch varnish layers.

9. The lens according to claim 8, wherein the third and fourth anti-scratch varnish layers comprise thermosetting polysiloxane to which at least one alkoxysiloxane with a thiol group is added.

10. The lens according to claim 9, wherein the third and fourth anti-scratch varnish layers are from 1 to 10 μm thick.

11. The lens according to claim 1, wherein the thickness of the precious metal layer is from 1 to 100 nm.

12. The lens according to claim 11, wherein the thickness of the precious metal layer is from 10 to 50 nm.

13. The lens according to claim 1, wherein the precious metal layer is made of gold, the first anti-reflective layer and the metal film are made of chromium, and the second anti-reflective layer is made of silicon oxide.

14. A method for making the eyeglass lens according to claim 1 comprising:
   applying anti-scratch varnish layers by dipping an assembly composed of the substrate, the precious metal layer, and the first and second anti-reflective layers in a varnish bath;
   drying the dipped assembly; and
   oven-curing the dried assembly, wherein the precious metal layer, and the first and second anti-reflective layers are deposited one at a time by vacuum evaporation.

15. A pair of eyeglasses comprising the lens according to claim 1.

* * * * *